US011087226B2

(12) United States Patent
Cheng et al.

(10) Patent No.: US 11,087,226 B2
(45) Date of Patent: Aug. 10, 2021

(54) IDENTIFYING MULTIPLE CAUSAL ANOMALIES IN POWER PLANT SYSTEMS BY MODELING LOCAL PROPAGATIONS

(71) Applicant: NEC Laboratories America, Inc., Princeton, NJ (US)

(72) Inventors: Wei Cheng, New York, NY (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 859 days.

(21) Appl. No.: 15/888,472

(22) Filed: Feb. 5, 2018

(65) Prior Publication Data

US 2018/0307994 A1 Oct. 25, 2018

Related U.S. Application Data

(60) Provisional application No. 62/489,547, filed on Apr. 25, 2017.

(51) Int. Cl.
*G06N 20/00* (2019.01)
*G06N 5/04* (2006.01)
(Continued)

(52) U.S. Cl.
CPC ......... *G06N 5/048* (2013.01); *G05B 23/0254* (2013.01); *G05B 23/0281* (2013.01); *G06F 16/9024* (2019.01); *G06F 17/16* (2013.01); *G06K 9/6221* (2013.01); *G06K 9/6224* (2013.01); *G06N 5/022* (2013.01); *G06N 5/045* (2013.01); *G06N 7/005* (2013.01); *G06N 20/00* (2019.01)

(58) Field of Classification Search
None
See application file for complete search history.

(56) References Cited

U.S. PATENT DOCUMENTS

2018/0218277 A1* 8/2018 Korsedal ............... G06N 7/005

OTHER PUBLICATIONS

Cheng et al., "Ranking Causal Anomalies via Temporal and Dynamical Analysis on Vanishing Correlations", KDD '16, Aug. 2016, pp. 1-10.

(Continued)

*Primary Examiner* — David R Vincent
(74) *Attorney, Agent, or Firm* — Joseph Kolodka (57) ABSTRACT

A system identifies multiple causal anomalies in a power plant having multiple system components. The system includes a processor. The processor constructs an invariant network model having (i) nodes, each representing a respective system component and (ii) invariant links, each representing a stable component interaction. The processor constructs a broken network model having (i) the invariant network model nodes and (ii) broken links, each representing an unstable component interaction. The processor ranks causal anomalies in node clusters in the invariant network model to obtain anomaly score results. The processor generates, using a joint optimization clustering process applied to the models, (i) a model clustering structure and (ii) broken cluster scores. The processor performs weighted fusion ranking on the anomaly score results and broken cluster scores, based on the clustering structure and implicated degrees of severity of any abnormal system components, to identify the multiple causal anomalies in the power plant.

20 Claims, 7 Drawing Sheets

(51) Int. Cl.
G06F 17/16 (2006.01)
G06F 16/901 (2019.01)
G06K 9/62 (2006.01)
G06N 5/02 (2006.01)
G05B 23/02 (2006.01)
G06N 7/00 (2006.01)

(56) References Cited

OTHER PUBLICATIONS

Jiang, et al., "Discovering Likely Invariants of Distributed Transaction Systems for Autonomic System Management", 2006 IEEE International Conference on Autonomic Computing, Jun. 2006 pp. 199-208.

Jiang, et al., "Modeling and Tracking of Transaction Flow Dynamics for Fault Detection in Complex Systems", IEEE Transactions on Dependable and Secure Computing, Oct.-Dec. 2006, pp. 312-326, vol. 3, No. 4.

Yang, et al., "Low-Rank Doubly Stochastic Matrix Decomposition for Cluster Analysis", Journal of Machine Learning Research 17 (2016), Oct. 2016, pp. 1-25.

Hirose, et al., "Network Anomaly Detection based on Eigen Equation Compression", KDD'09, Jun. 2009, pp. 1185-1193.

Chen, et al., "Exploiting Local and Global Invariants for the Management of Large Scale Information Systems", 2008 Eighth IEEE International Conference on Data Mining, Dec. 2008, 10 pages.

Ge, et al., "Ranking Metric Anomaly in Invariant Networks", ACM Transactions on Knowledge Discovery from Data, May 2014, vol. 8, No. 2, Article 8, 30 pages.

Tao, et al., "Metric Ranking of Invariant Networks with Belief Propagation", 2014 IEEE International Conference on Data Mining, December, pp. 1001-1006.

Zass, et al., "Doubly Stochastic Normalization for Spectral Clustering", Proceeding NIPS'06 Proceedings of the 19th International Conference on Neural Information Processing Systems, Dec. 2006, 8 pages.

Kyu, et al., On Algorithms for Sparse Multi-factor NMF, NIPS'13 Proceedings of the 26th International Conference on Neural Information Processing Systems, Dec. 2013, pp. 1-9.

Zhou, et al., "Learning with Local and Global Consistency", Proceeding NIPS'03 Proceedings of the 16th International Conference on Neural Information Processing Systems, Dec. 2003, 8 pages.

Ide, et al., "Computing Correlation Anomaly Scores using Stochastic Nearest Neighbors", ICDM 2007, Oct. 2007, 6 pages.

Ide, et al., "Proximity-Based Anomaly Detection using Sparse Structure Learning", Proceedings of the 2009 SIAM International Conference on Data Mining, Apr. 2009, pp. 97-108.

Hara, et al., "A Consistent Method for Graph Based Anomaly Localization", 18th International Conference on Artificial Intelligence and Statistics (AISTATS), May 2015, pp. 333-341.

Wang et al., "Structured Doubly Stochastic Matrix for Graph Based Clustering", KDD '16, Aug. 2016, 10 pages.

\* cited by examiner

IDENTIFYING MULTIPLE CAUSAL ANOMALIES IN POWER PLANT SYSTEMS BY MODELING LOCAL PROPAGATIONS

RELATED APPLICATION INFORMATION

This application claims priority to provisional application Ser. No. 62/489,547 filed on Apr. 25, 2017, incorporated herein by reference.

BACKGROUND

Technical Field

The present invention relates to power systems, and more particularly to identifying multiple causal anomalies in power plant systems by modeling local propagations.

Description of the Related Art

A fundamental problem in power plant system management is the performance of diagnosis operations in the case of system failure in order to identify the causal anomalies (i.e., root causes) for system debugging and repair.

Recently, an invariant network has proven a useful tool for anomaly inference and detections. In an invariant network, each node is a system component, and each link signifies a stable correlation between a pair of components. A link may be broken when either of its end nodes are affected by system faults. The content of the invariant network, in particular the fault propagation patterns underlying the broken links, can serve as an important clue in profiling causal anomalous system behaviors. However, existing methods typically assume there is only a single and global fault propagation process in the whole network. However, in real-world large-scale complex systems, it is more common for multiple fault propagations to grow simultaneously and locally within different clusters to jointly define the system failure status. Hence, there is a need for an approach to identifying multiple causal anomalies in power plant systems.

SUMMARY

According to an aspect of the present invention, a system is provided for identifying multiple causal anomalies in a power plant system having multiple system components. The system includes a processor. The processor is configured to construct an invariant network model having (i) a plurality of nodes, each representing a respective one of the multiple system components and (ii) a plurality of invariant links, each representing a stable component interaction. The processor is further configured to construct a broken network model having (i) all of the plurality of nodes in the invariant network model and (ii) a set of broken links existing at a given time, each representing an unstable component interaction. The processor is also configured to rank causal anomalies in node clusters in the invariant network model to obtain anomaly score results therefor. The processor is additionally configured to generate, using a joint optimization clustering process applied to the models, (i) a clustering structure for the models and (ii) a set of broken cluster scores, each representing a respective one of multiple degrees of brokenness for node clusters in the broken network model. The processor is further configured to perform weighted fusion ranking on the anomaly score results and the set of broken cluster scores, based on the clustering structure and implicated degrees of severity of any abnormal ones of the multiple system components, to identify the multiple causal anomalies in the power plant system.

According to another aspect of the present invention, a computer-implemented method is provided for identifying multiple causal anomalies in a power plant system having multiple system components. The method includes constructing, by a processor, an invariant network model having (i) a plurality of nodes, each representing a respective one of the multiple system components and (ii) a plurality of invariant links, each representing a stable component interaction. The method further includes constructing, by the processor, a broken network model having (i) all of the plurality of nodes in the invariant network model and (ii) a set of broken links existing at a given time, each representing an unstable component interaction. The method also includes ranking, by the processor, causal anomalies in node clusters in the invariant network model to obtain anomaly score results therefor. The method additionally includes generating, by the processor using a joint optimization clustering process applied to the models, (i) a clustering structure for the models and (ii) a set of broken cluster scores, each representing a respective one of multiple degrees of brokenness for node clusters in the broken network model. The method further includes performing, by the processor, weighted fusion ranking on the anomaly score results and the set of broken cluster scores, based on the clustering structure and implicated degrees of severity of any abnormal ones of the multiple system components, to identify the multiple causal anomalies in the power plant system.

According to yet another aspect of the present invention, a computer program product is provided for identifying multiple causal anomalies in a power plant system having multiple system components. The computer program product includes a non-transitory computer readable storage medium having program instructions embodied therewith. The program instructions are executable by a computer to cause the computer to perform a method. The method includes constructing, by a processor, an invariant network model having (i) a plurality of nodes, each representing a respective one of the multiple system components and (ii) a plurality of invariant links, each representing a stable component interaction. The method further includes constructing, by the processor, a broken network model having (i) all of the plurality of nodes in the invariant network model and (ii) a set of broken links existing at a given time, each representing an unstable component interaction. The method also includes ranking, by the processor, causal anomalies in node clusters in the invariant network model to obtain anomaly score results therefor. The method additionally includes generating, by the processor using a joint optimization clustering process applied to the models, (i) a clustering structure for the models and (ii) a set of broken cluster scores, each representing a respective one of multiple degrees of brokenness for node clusters in the broken network model. The method further includes performing, by the processor, weighted fusion ranking on the anomaly score results and the set of broken cluster scores, based on the clustering structure and implicated degrees of severity of any abnormal ones of the multiple system components, to identify the multiple causal anomalies in the power plant system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to identifying multiple causal anomalies in power plant systems by modeling local propagations.

As noted above, in real-world large-scale complex systems, it is more common for multiple fault propagations to grow simultaneously and locally within different clusters to jointly define the system failure status. In view of the preceding, the present invention provides a two-phase framework to identify multiple causal anomalies and perform ranking in a fine grained manner. In an embodiment, in the first phase, a joint, sparse probabilistic clustering is used to uncover meaningful functional modules in both the invariant network and the broken network. Then, in an embodiment, in the second phase, a multiple-pattern, low-rank network diffusion model is designed to back track causal anomalies in each of the impaired clusters.

In an embodiment, the present invention provides a Cluster Ranking based fault Diagnosis (CRD) algorithm (hereinafter interchangeably referred to as "CRD" in short) to locate causal anomalies in a fine-grained manner. CRD adopts a two-phase framework. In an embodiment, in the first phase, clusters in the invariant network are identified that are heavily broken, by jointly clustering the invariant and broken networks together in order to boost their respective accuracy. Furthermore, each cluster is assigned a score to measure the severity of the broken invariance. In an embodiment, in the second phase a low-rank network diffusion model is provided to backtrack causal anomalies with the guidance from the results of the first phase. CRD can accurately find multiple clusters of invariance edges that are impaired by anomalies. Furthermore, it can accurately model local propagations in different clusters. In practice, causal anomalies often remain stable within a short period of time when the fault propagates in the system. Thus, in an embodiment, the present invention jointly models successive broken networks to resolve ambiguities caused by system noise. While existing methods typically consider one broken network at a time, CRD can integrate multiple broken networks for more reliable fault diagnosis.

Figure 1:
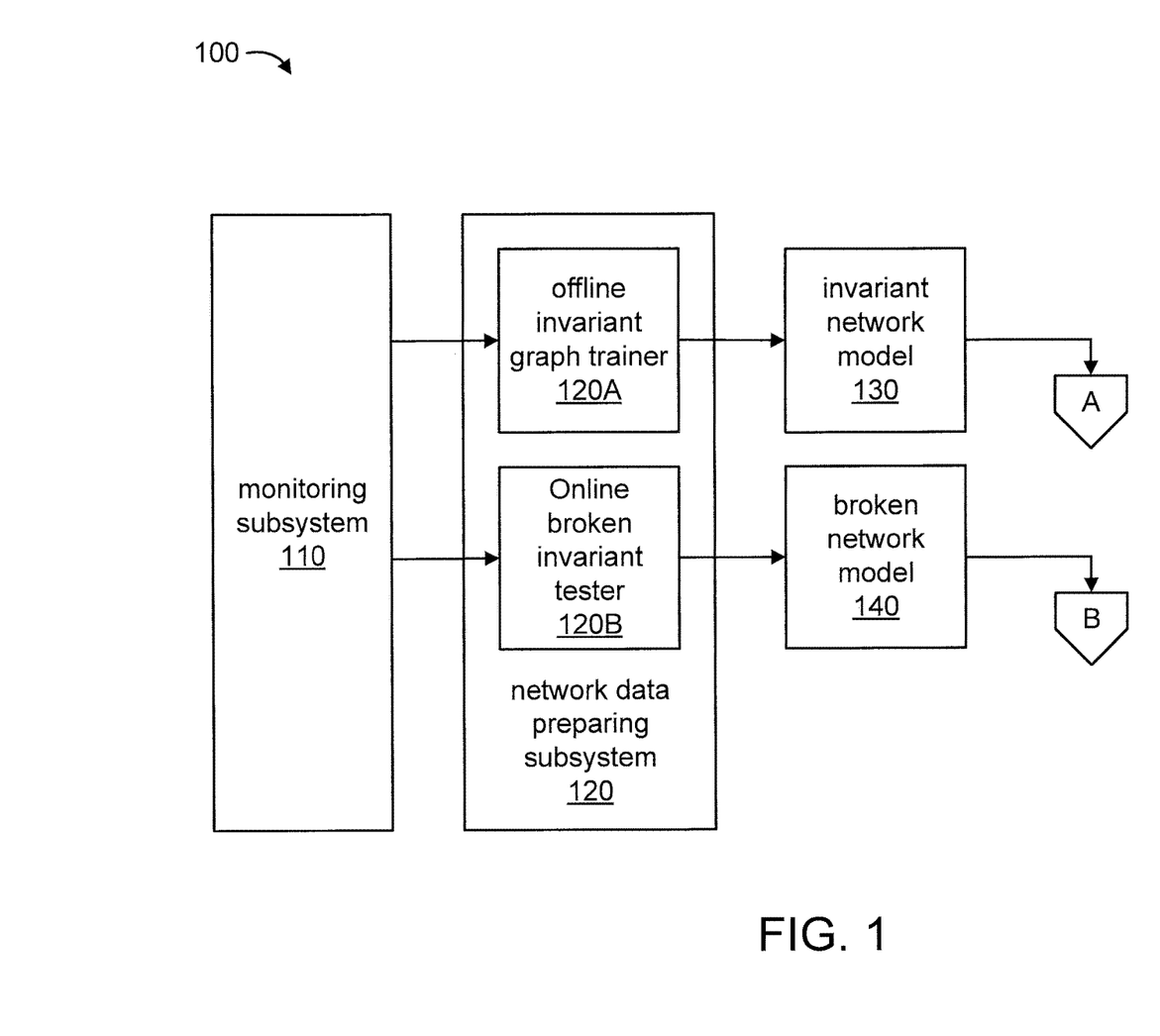
FIGS. 1-2 show an exemplary system for identifying multiple causal anomalies in power plant systems by modeling local propagations, in accordance with an embodiment of the present invention.
Figure 2:
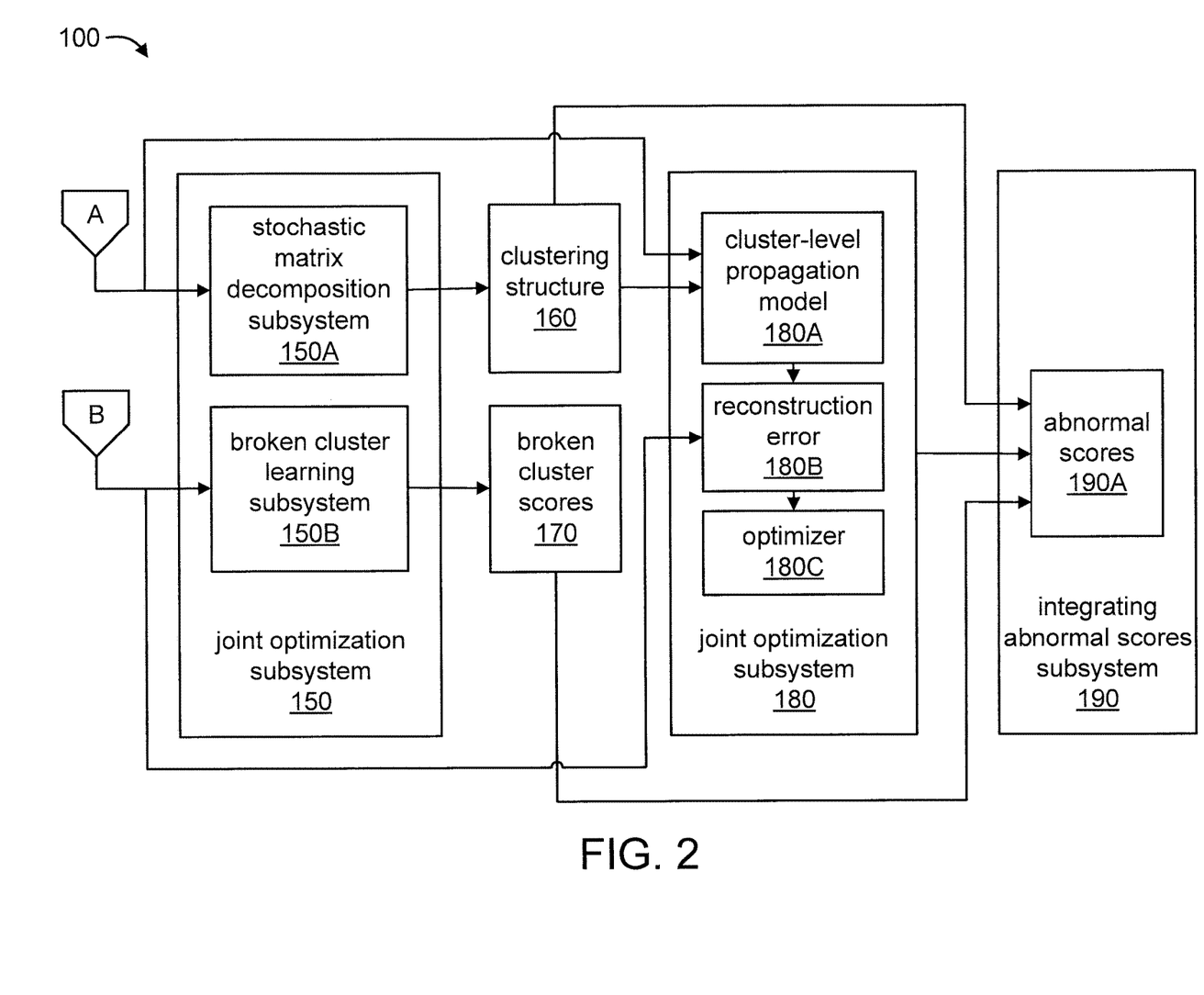

FIGS. 1-2 show an exemplary system 100 for identifying multiple causal anomalies in power plant systems by modeling local propagations, in accordance with an embodiment of the present invention.

The system 100 includes a monitoring subsystem 110, a graph training and broken network testing subsystem (also interchangeably referred to herein as "network data preparing subsystem") 120, an invariant network model (hereinafter interchangeably referred to as "invariant network" in short) 130, a broken network 140 (hereinafter interchangeably referred to as "broken network" in short), an invariant network and broken network joint clustering and broken cluster score learning subsystem 150 (also interchangeably referred to herein as "joint optimization subsystem"), a clustering structure 160, a set of broken cluster scores 170, a causal anomaly inference subsystem 180, and an integrating abnormal scores subsystem 190.

The monitoring subsystem 110 monitors and collects time series data. The monitoring subsystem 110 use sensors to monitor the system status of different components of a power plant system.

The graph training and broken network testing subsystem 120 includes an offline invariant graph trainer 120A and an online broken invariant tester 120B. The offline invariant graph trainer 120A outputs the invariant network 130. The offline broken invariant tester 120B outputs the broken network 140.

The invariant network and broken network joint clustering and broken cluster score learning subsystem 150 includes a stochastic matrix decomposition subsystem 150A, and a broken cluster learning subsystem 150B. In an embodiment, stochastic matrix decomposition subsystem 150A functions to as an invariant network clusterer that employs a stochastic matrix decomposition approach. In an embodiment, the subsystem 150B models the generation of a broken network. In the aforementioned modeling process, the subsystem 150B learns a "broken score" for each cluster in the network to indicate its broken degree.

In an embodiment, the subsystems 150A and 150B are unified in a joint optimization problem. In an embodiment, the joint optimization problem is solved by an iterative algorithm. The invariant network and broken network joint clustering and broken cluster score learning subsystem 150 outputs the clustering structure 160 and the set of broken cluster scores 170.

The causal anomaly inference subsystem 180 includes a cluster-level label propagation model 180A, a reconstruction error modeler 180B, and an optimizer 180C. The cluster-level label propagation model 180A incorporates the clustering results of subsystem 150 to guide the label propagation process starting from several seed anomalies, in different clusters in the invariant network 130. The reconstruction error modeler 180B models the reconstruction error of the propagated anomalies and the broken network. In an embodiment, the optimizer 180C can be implemented as an iterative optimization algorithm to compute several causal anomaly vectors, each for a cluster in the invariant network 130.

The integrating abnormal scores subsystem 190 includes results 190A in the form of abnormal scores. The subsystem 190 integrates the clustering results, broken cluster score results, and anomaly score results into a final causal anomaly score vector, so as to accurately reflect multiple fault propagations that happen in different clusters in the invariant network 130.

Regarding the elements of system 100, it is to be appreciated that each of the elements can be implemented by one or more hardware devices, one or more software programs, and/or a combination of hardware and software. It is to be further appreciated that any involved software will necessarily involve at least a processor and corresponding memory in order to execute the same. These and other variations of the elements of system 100 are readily determined by one of ordinary skill in the art, given the teachings of the present invention provided herein, while maintaining the spirit of the present invention.

A further description will now be given of at least some of the elements of system 100, in accordance with an embodiment of the present invention. To that end, it is to be appreciated that various aspects of the present invention are further described in detail hereinafter. As such, the number of equations may not be initially sequential until the actual beginning of the further description is reached. Accordingly, it is to be further appreciated that equations having the same number are the same equation. The various equations presented initially are so presented for the sake of illustration and further clarified in the described thereafter.

Further regarding monitoring subsystem 110, the same monitors and collects time series data from a power plant system. In an embodiment, the monitoring subsystem 110 uses sensors to monitor system status of different components of the power plant system. Each sensor is to record the value indicating the status of running for given sub-component of the system, for example, the pressure, the temperature, speed, i.e. These recorded time series jointly profile the system of power plant.

Further regarding graph training and broken network testing subsystem 120, the same can obtain links in an invariant network as follows. For a pair of time series from the power plant system, x(t) and y(t) generated by two system components (nodes), where t is the time index, their relationship can be described by a linear regression function as follows:

$$y(t)=a_1y(t-1)+ \ldots +a_ny(t-n)+b_0x(t-k)+ \ldots +b_mx(t-k-m) \quad (1)$$

where [n, m] is referred to as the order of the model, which determines how many previous steps are affecting the current outputs x(t) and y(t). Parameters $a_i$ and $b_j$ indicate how strongly a previous step is impacting the current output, which can be learned by the least-square fitting of Equation (1) to the training data. Once the parameters are obtained, a fitness score can be used to evaluate how well the learned model fits the observed measurement data. A large fitness score indicates the relationship (x, y) holds well in normal system state. A pair of time series with a fitness score larger than a pre-defined threshold is referred to as an invariant of the system. The invariant network includes all invariants when the system is normal. During the system testing period, a broken invariant can be detected by checking if the time series generated by the two connected components still fit the learned model. If the error is large, then the invariant (x, y) is declared to be broken. A broken network includes all broken invariants.

Further regarding the stochastic matrix decomposition subsystem 150A, a doubly stochastic matrix decomposition approach is adopted as a basic clustering method, which is superior in clustering real-world sparse networks.

Suppose there are k clusters in A, let $U \in R^{z \times k}$ be a cluster membership matrix with $U_{xi}=P(i|x)$ indicating the probability that node x belongs to cluster i. A doubly stochastic approximation to an invariant network A is defined by the following:

Let $U \in \mathbb{R}^{n \times k}$ be a cluster membership matrix with $U_{xi}=P(i|x)$, where k is the number of clusters. Equation (1) can be rewritten as follows:

$$\hat{A}_{xy} = \sum_{i=1}^{k} \frac{U_{xi}U_{yi}}{\sum_{z=1}^{n} U_{zi}} \quad (4)$$

where i is the cluster index, x, y and z are node indexes. Note $\tilde{A} \in R^{n \times n}$ is symmetric, whose columns and rows all sum up to 1.

The goal is to infer U by minimizing the approximation error of the KL-Divergence DKL (A|^A). To control the sparsity of U, the Dirichlet prior on U can be introduced, which gives the following objective function:

$$\mathcal{J}_A(U) = -\sum_{(x,y) \in \varepsilon_A} A_{xy} \log \hat{A}_{xy} - (\alpha-1) \sum_{xi} \log U_{xi} \quad (6)$$

s.t. $U \geq 0, U1_k = 1_n$ where $\alpha$ ($\alpha \geq 1$) is a parameter in the Dirichlet distribution, 1k is a column vector of length k with all 1's. Equality constraints are enforced to preserve the probabilistic interpretation of $u_{xi}$.

Further regarding the broken cluster learning subsystem 150B, the initial system failures will propagate locally inside their corresponding clusters. These correspond to the clusters observed in the broken network B. We refer to such clusters as broken clusters. Existing approaches are typically unaware of the clustering structure of the broken network and assume a single global prorogation process in the whole network. We propose a generative model to learn the broken clusters from B. The intuition is that an invariant pair (x, y) is more likely to break if both nodes x and y reside in a severely broken cluster. To quantify how severe a cluster is broken, for each cluster i, we define a broken score $s_i$ ($0 \leq s_i \leq 1$). Then we define the probability that an invariant is broken as follows:

$$P_b(x,y) = \sum_{i=1}^{k} U_{xi}U_{yi}s_i \quad (7)$$

Note that $P_b(x,y)$ is large only if nodes x and y belong to the same cluster i and cluster i has a high broken score $s_i$. A broken invariant pair (x, y) can be simulated by Bernoulli distribution as follows:

$$B_{xy} \sim \text{Bernoulli}(P_b(x,y))$$

Letting $E_B$ be the set of edges in B, the probability to collectively generate a broken network can be represented by the following:

$$P(B|U,s) = \prod_{(x,y) \in \varepsilon_B} P_b(x,y) \prod_{(x,y) \in \varepsilon_A \setminus \varepsilon_B} [1 - P_b(x,y)]$$

Let $W \in \{0,1\}^{n \times n}$ be an indicator matrix, $W_{xy}=1$ if $A_{xy}>0$ but $B_{xy}=0$, i.e., (x,y) is a non-broken invariant link. Then we can write the negative log-likelihood function as follows:

$$\mathcal{J}_B(U,s) = \quad (10)$$

$$-\sum_{xy} B_{xy} \log\left(\sum_i U_{xi}U_{yi}s_i\right) - \sum_{xy} W_{xy} \log\left(1 - \sum_i U_{xi}U_{yi}s_i\right)$$

Further regarding the invariant network and broken network joint clustering and broken cluster score learning subsystem 150 jointly clusters the invariant and broken networks for broken cluster identification, by integrating $J_A$ and $J_B$ into a joint optimization problem as follows:

$$\min\nolimits_{U,s} \mathcal{J}_{CR}(U,s) = \mathcal{J}_A + \beta \mathcal{J}_B$$

$$s.t. U1_k = 1_n, U \geq 0, 0 \leq s_i \leq 1, \forall 1 \leq i \leq k \quad (11)$$

where $\beta$ is a parameter to balance the importance of $J_A$ and $J_B$. Intuitively, the more reliable the broken network, the larger the value of $\beta$.

Further regarding the cluster-level label propagation model 180A, the following factors were considered. A system failure can occur due to a set of root causes, or causal anomalies. As time flows, causal anomalies can propagate their impacts towards neighbors along the paths as represented by the invariant links in A. Suppose we have a seed vector $e \in \mathbb{R}^{n \times 1}$ with $e_x$ denoting the degree that node x is a causal anomaly. After propagation, each node x will obtain a status score $r_x$ to indicate how much it is impacted by the root causes. This process can be simulated by a label propagation model as follows:

$$\min_{r \geq 0} cr^T(I_n - \tilde{A})r + (1-c)\|r - e\|_F^2$$

where $I_n$ is an n-by-n identity matrix, $\tilde{A} = D^{-1/2}AD^{-1/2}$ is a symmetrically normalized matrix of A, D is a diagonal matrix with $D_{xx} = \sum_{y=1}^{n} A_{xy}$.

Further regarding the reconstruction error modeler 180B, by our observations, causal anomalies often propagate impacts inside their associated clusters, different broken clusters can have different sets of causal anomalies. Thus, for each cluster i, we define $e^{(i)} \in \mathbb{R}^{n \times 1}$ as a cluster-specific seed vector. To explicitly identify causal anomalies that harms a cluster i, we regard $U_{xi}e_x$ as a causal anomaly score of node x, where $U_{xi}$ is obtained by the invariant network and broken network joint clustering and broken cluster score learning subsystem 150. This suggests that x should reside in cluster i (i.e., high $U_{xi}$) and is abnormal (i.e., high $e_x$).

Correspondingly, we assume propagations in different clusters are run independently, generating different status score vectors $r^{(i)} \in \mathbb{R}^{n \times 1}$. Then, the propagation relationship between $e^{(i)}$ and $r^{(i)}$ can be represented by the following:

$$r^{(i)} = (1-c)(I_n - c\tilde{A})^{-1}(U_{*i} \circ e^{(i)}) \quad (14)$$

where $\circ$ is entry-wise product, $U_{*i}$ is the $i^{th}$ column of U.

Since our goal is to backtrack $\{e^{(1)}, e^{(2)}, \ldots, e^{(k)}\}$, we propose to use $\{r^{(1)}, r^{(2)}, \ldots, r^{(k)}\}$ to reconstruct the broken network B. Intuitively, when there is a broken invariant (x,y), i.e., $B_{xy}$ is large, then at least one node of x and y should be impaired by some causal anomalies from some clusters. That is, either $r_x^{(i)}$ or $r_y^{(i)}$ is large for some i. This suggests the following reconstruction error $$\sum_{(x,y) \in \varepsilon_A} (\sum_{i=1}^{k} r_x^{(i)} r_y^{(i)} - B_{xy})^2 \quad (15)$$

Equivalently, let $E = [e^{(1)}, \ldots e^{(k)}]$, $H = (1-c)(I_n - c\tilde{A})^{-1}$, and $C \in \{0,1\}^{n \times n}$ with $C_{xy} = 1$ if $(x,y) \in \varepsilon_A$. We can rewrite Equation (19) by a matrix form and formulate an optimization problem as follows:

$$\min_{E \geq 0} \mathcal{J}_H = \|C \circ [H(U \circ E)(U \circ E)^T H^T] - B\|_F^2 + \tau \|E\|_1 \quad (16)$$

where $\hat{H}$ is an efficient approximation of H by iteratively updating $$\hat{H}^{(t+1)} \leftarrow c\tilde{A}\hat{H}^{(t)} + (1-c)I_n \quad (22)$$

until convergence. The convergence is guaranteed.

We also add a $\ell_1$ norm on E to encourage sparsity of E since often only a few nodes are causal anomalies. $\tau$ is a controlling parameter, where a larger $\tau$ typically results in more zeros in E.

Further regarding the optimizer 180C, E can be solved by the following iterative optimization algorithm:

$$E_{xi} = \tilde{E}_{xi} \left( \frac{4(\Phi \circ U)_{xi}}{4(\Theta \circ U)_{xi} + \tau} \right)^{\frac{1}{4}} \text{ where} \quad (25)$$

$$\Theta = \hat{H}^T \{C \circ [\hat{H}(U \circ E)(U \circ E)^T \hat{H}^T]\} \hat{H}(U \circ E) \text{ and}$$

$$\Phi = \hat{H}^T (B \circ C) \hat{H}(U \circ E)$$

This is based on the common non-negative matrix factorization algorithm.

Further regarding the integrating abnormal scores subsystem 190, after obtaining E, we can identify a node x with a high $U_{xi}e_x^{(i)}$ score as a causal anomaly for cluster i, when we observe cluster i has a high broken score $s_i$ (obtained by invariant network joint clustering and broken cluster score learning subsystem 150).

For ease of examination, we also integrate node anomaly scores in different clusters into a unified score G for each node x. Ideally, G is large if x is a causal anomaly to some cluster i (i.e., high $U_x e_x^{(i)}$) and cluster i is broken severely (i.e., high $s_i$). This suggests $f_x = U_{xi}e_x^{(i)} s_i$. Equivalently, we have the following:

$$f = (U \circ E)s$$

It is believed that the unified causal anomaly score vector f can accurately reflect the local propagations of causal anomaly impacts that are launched in multiple clusters.

Figure 3:
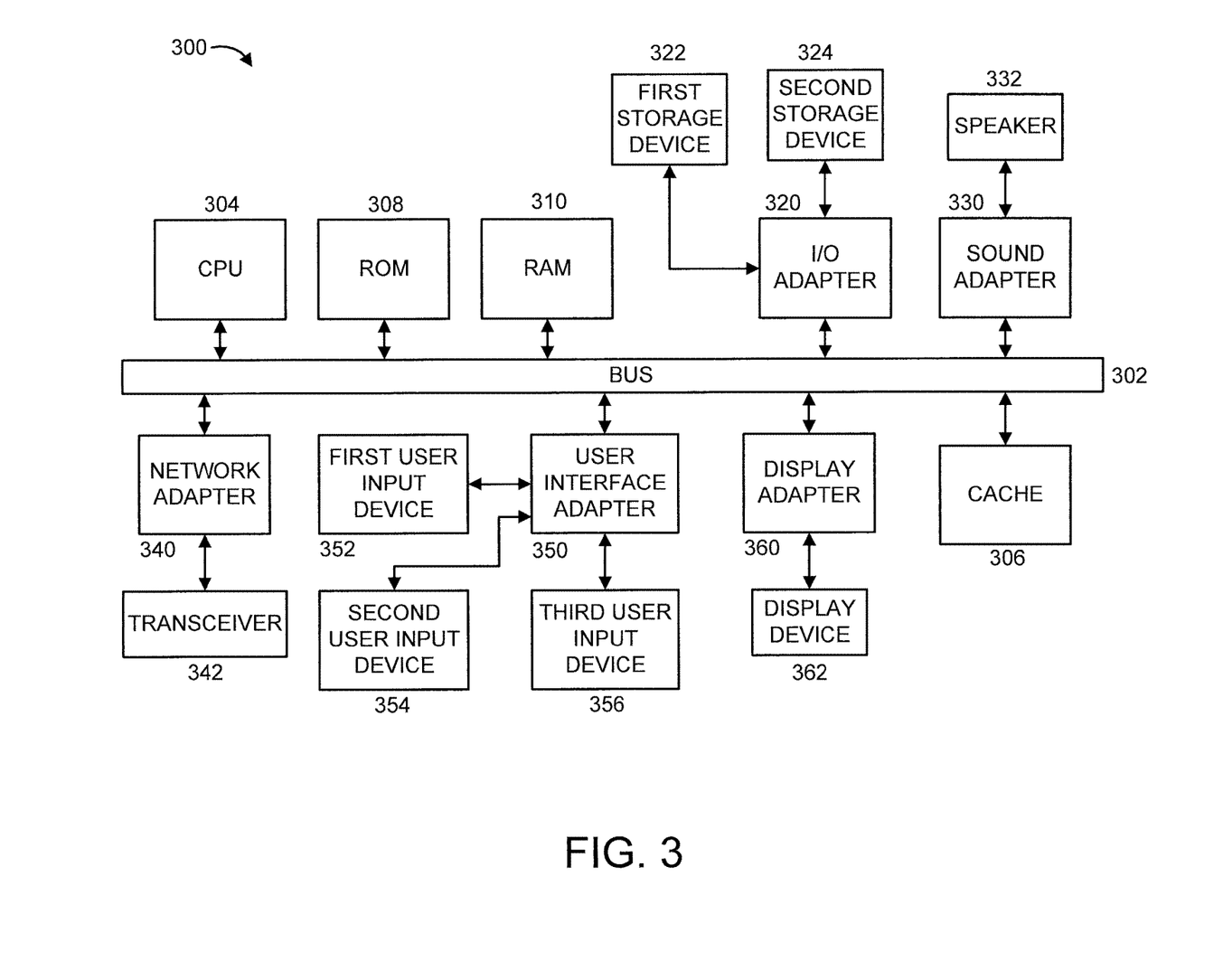
FIG. 3 shows an exemplary processing system to which the present principles may be applied, according to an embodiment of the present principles.
Figure 4:
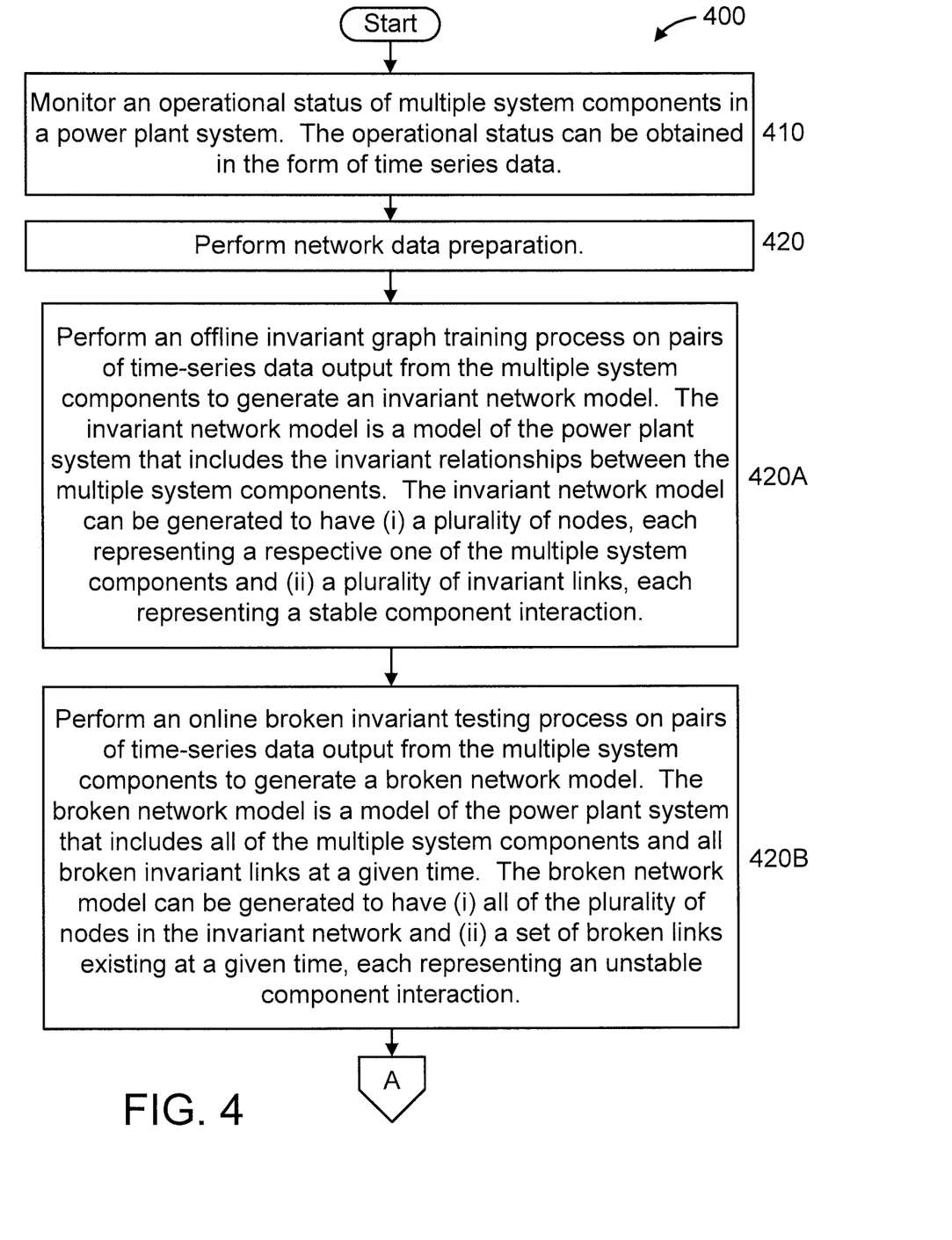
FIGS. 4-7 show an exemplary method for identifying multiple causal anomalies in power plant systems by modeling local propagations, in accordance with an embodiment of the present principles.
Figure 5:
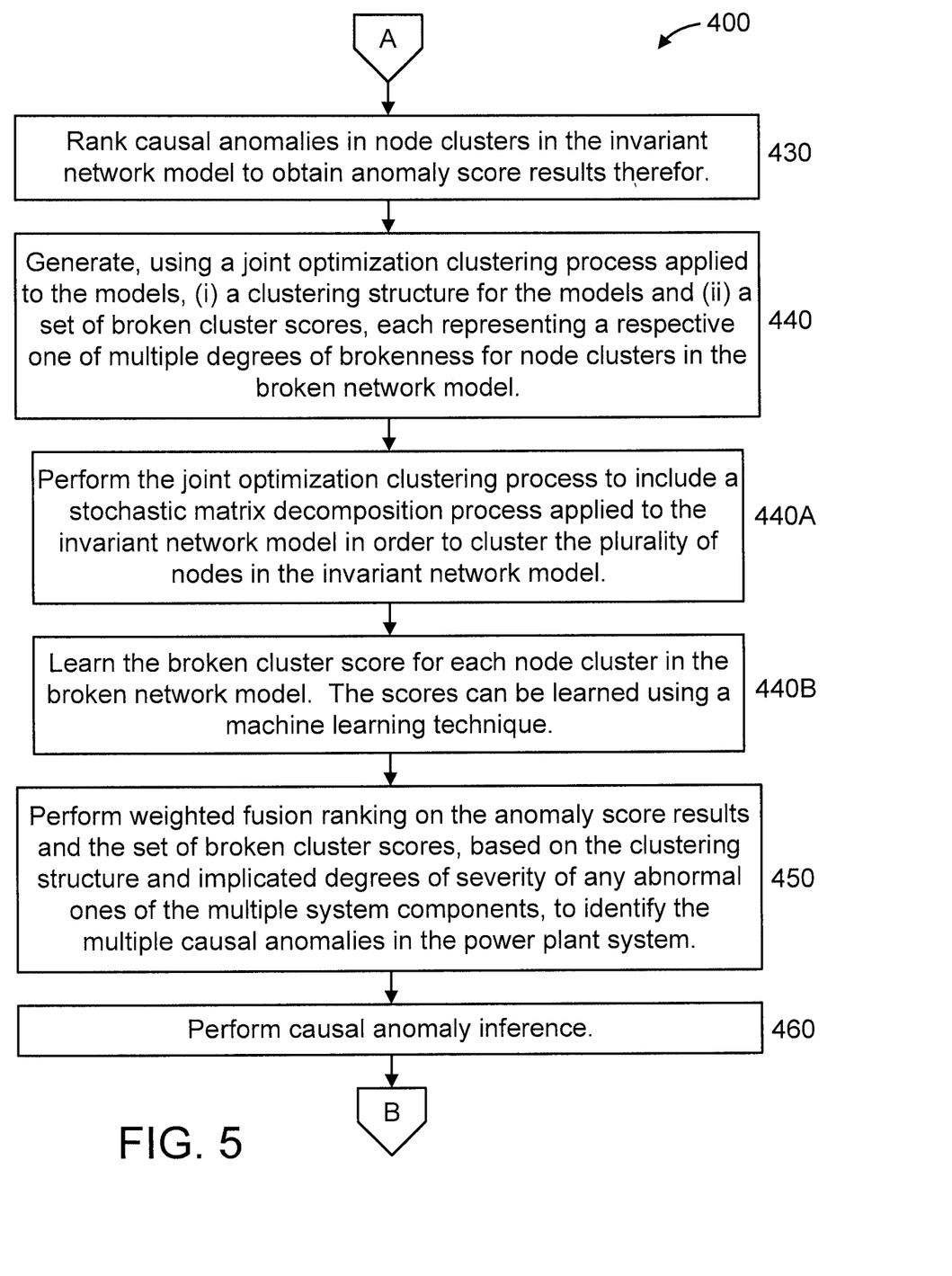
Figure 6:
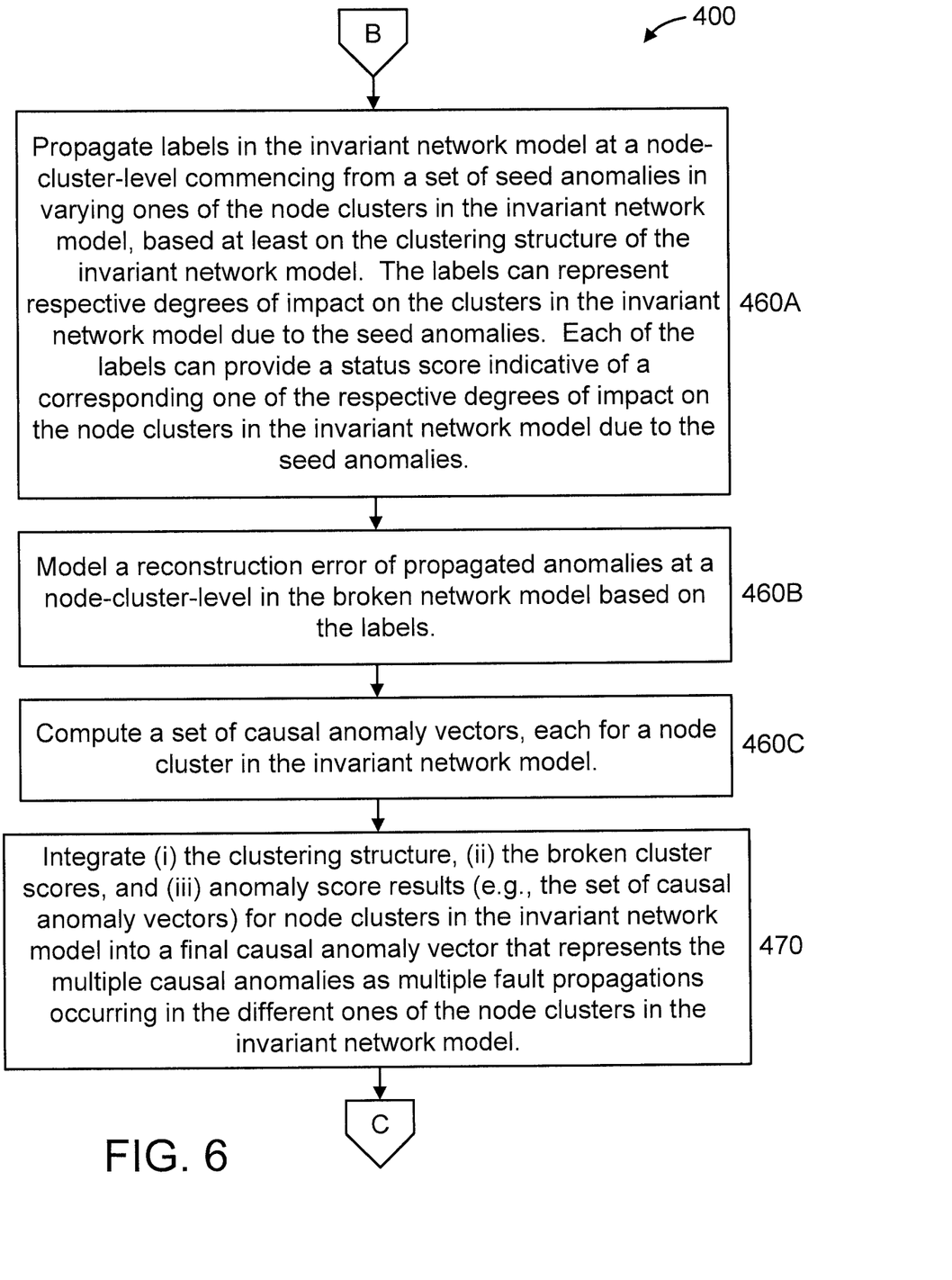
Figure 7:
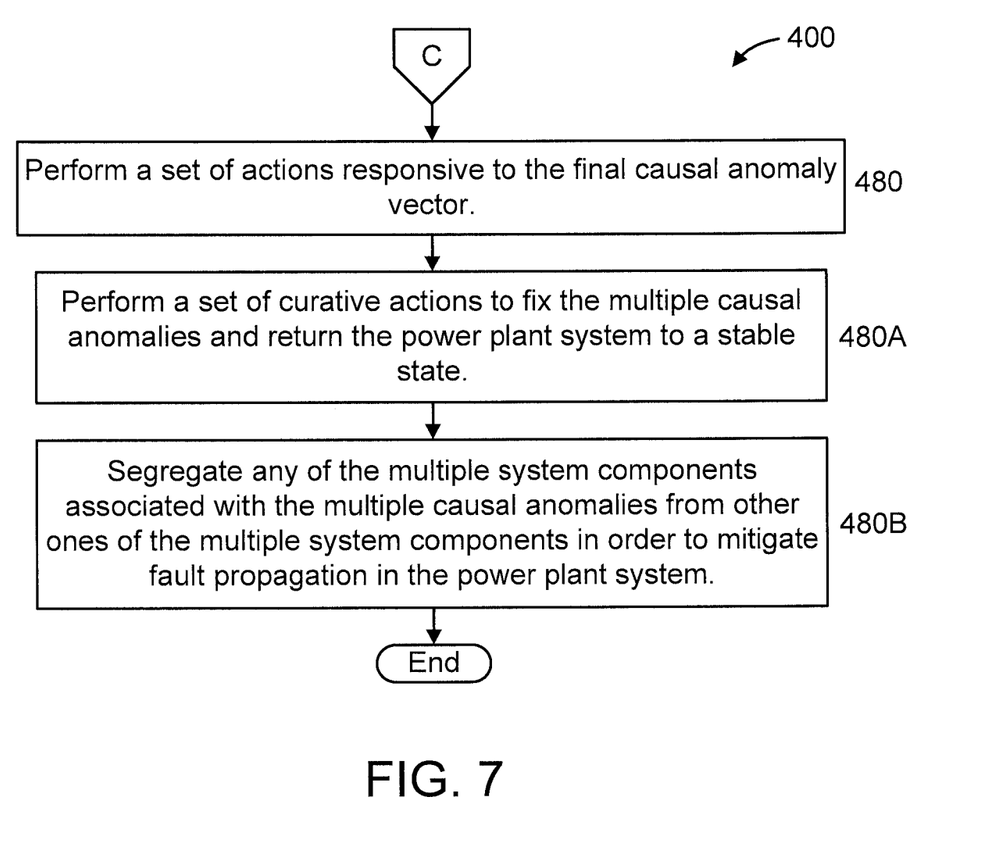

FIG. 3 shows an exemplary processing system 300 to which the present principles may be applied, according to an embodiment of the present principles.

The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Moreover, it is to be appreciated that system 100 described above with respect to FIGS. 1-2 is a system for implementing respective embodiments of the present principles. Part or all of processing system 300 may be implemented in one or more of the elements of system 100.

Further, it is to be appreciated that system 100 may perform at least part of the method described herein including, for example, at least part of method 400 of FIGS. 4-7. Similarly, part or all of any of system 300 may be used to perform at least part of method 400 of FIGS. 4-7.

FIGS. 4-7 show an exemplary method 400 for identifying multiple causal anomalies in power plant systems by modeling local propagations, in accordance with an embodiment of the present principles.

At block 410, monitor an operational status (hereinafter "status") of multiple system components in a power plant system. In an embodiment, the operational status can be obtained in the form of time series data. Of course, other data forms can also be processed, while maintaining the spirit of the present invention.

At block 420, perform network data preparation.

In an embodiment, block 420 can include one or more of blocks 420A and 420A.

At block 420A, perform an offline invariant graph training process on pairs of time-series data output from the multiple system components to generate an invariant network model. The invariant network model is a model of the power plant system that includes the invariant relationships between the multiple system components. Hence, in an embodiment, the invariant network model can be generated to have (i) a plurality of nodes, each representing a respective one of the multiple system components and (ii) a plurality of invariant links, each representing a stable component interaction.

At block 420B, perform an online broken invariant testing process on pairs of time-series data output from the multiple system components to generate a broken network model. The broken network model is a model of the power plant system that includes all of the multiple system components and all broken invariant links at a given time. Hence, in an embodiment, the broken network model can be generated to have (i) all of the plurality of nodes in the invariant network model and (ii) a set of broken links existing at a given time, each representing an unstable component interaction.

At block 430, rank causal anomalies in node clusters in the invariant network model to obtain anomaly score results therefor.

At block 440, generate, using a joint optimization clustering process applied to the models, (i) a clustering structure for the models and (ii) a set of broken cluster scores, each representing a respective one of multiple degrees of brokenness for node clusters in the broken network model.

In an embodiment, block 440 can include one or more of block 440A-440B.

At block 440A, perform the joint optimization clustering process to include a stochastic matrix decomposition process applied to the invariant network model in order to cluster the plurality of nodes in the invariant network model.

At block 440B, learn the broken cluster score for each node cluster in the broken network model. In an embodiment, the scores can be learned using a machine learning technique.

At block 450, perform weighted fusion ranking on the anomaly score results and the set of broken cluster scores, based on the clustering structure and implicated degrees of severity of any abnormal ones of the multiple system components, to identify the multiple causal anomalies in the power plant system.

At block 460, perform causal anomaly inference.

In an embodiment, block 460 can include one or more of blocks 460A-460C.

At block 460A, propagate labels in the invariant network model at a node-cluster-level commencing from a set of seed anomalies in varying ones of the node clusters in the invariant network model, based at least on the clustering structure of the invariant network model. In an embodiment, the labels can represent respective degrees of impact on the clusters in the invariant network model due to the seed anomalies. In an embodiment, each of the labels can provide a status score indicative of a corresponding one of the respective degrees of impact on the node clusters in the invariant network model due to the seed anomalies.

At block 460B, model a reconstruction error of propagated anomalies at a node-cluster-level in the broken network model based on the labels.

At block 460C, compute a set of causal anomaly vectors, each for a node cluster in the invariant network model.

At block 470, integrate (i) the clustering structure, (ii) the broken cluster scores, and (iii) anomaly score results (e.g., the set of causal anomaly vectors) for node clusters in the invariant network model into a final causal anomaly vector that represents the multiple causal anomalies as multiple fault propagations occurring in the different ones of the node clusters in the invariant network model.

At step 480, perform a set of actions responsive to the final causal anomaly vector.

In an embodiment, step 480 can include one or more of blocks 480A and 480B.

At block 480A, perform a set of curative actions to fix the multiple causal anomalies and return the power plant system to a stable state.

At block 480B, segregate any of the multiple system components associated with the multiple causal anomalies from other ones of the multiple system components in order to mitigate fault propagation in the power plant system.

Regarding block 480 and its sub-blocks, the preceding actions mentioned with respect thereto are merely illustrative and, thus, other actions can also be performed in response to object detection and tracking results. As is evident to one of ordinary skill in the art, the action(s) taken is(are) dependent upon identified anomalies.

A description will now be given regarding various aspects of the present invention.

In an invariant network, a node represents a system component, and an edge indicates a stable interaction between two components. During the evolution of the invariant network, an edge may break at some time point when either of its end nodes is affected by system faults. Therefore, the content of the invariant network, in particular the evolutionary patterns of broken edges, can serve as an important clue in locating causal anomalous nodes.

An invariant network model can be used to discover stable and significant dependencies between pairs of system components that are monitored through time series recordings. A strong dependency is called an invariant relationship. By combining the invariants learned from all monitoring components, an invariant network can be constructed. In an invariant network, a node represents a system component, and an edge represents an invariant link/relationship between a pair of components.

The practical value of an invariant network is that it can shed important light on abnormal system behaviors and in particular the source of anomalies, by checking whether existing invariants are broken. In a broken network model, one or more of the invariant links are broken at time point t. Such a broken invariant link usually implies abnormal behaviors have occurred in one or both of its connected components. Usually, a network including all system components and all the broken invariant links at a given time is called a broken network.

Some important properties of system fault propagations which have not been taken into account by existing methods at least include the following: (1) system faults are propagated locally within different clusters, rather than traversing globally through the whole network; and (2) there can be multiple fault propagations spreading in parallel in different clusters in the system. Therefore, by assuming a single and global propagation in the network, the existing methods cannot locate multiple impaired clusters. Consequently, many true anomalous nodes cannot be accurately detected.

To address the limitations of the existing methods, in this paper, we propose the Cluster Ranking based fault Diagnosis (CRD) algorithm (hereinafter interchangeably referred to as "CRD") to rank causal anomalies in a fine-grained two-phase manner. In Phase I, CRD identifies and ranks clusters in the invariant network by their severities of impairments. To enhance the accuracy of cluster finding, a joint clustering scheme is designed to leverage the complementary information in invariant and broken networks. In Phase II, a diffusion based low-rank network reconstruction model is proposed to backtrack causal anomalies in impaired clusters found in Phase I. This model can capture local and paralleled fault propagations in different clusters, making it suitable for locating multiple causal anomalies.

In practice, causal anomalies often remain stable within a short period of time when the faults are propagating in the system. Thus, we can jointly model successive broken networks to resolve ambiguities caused by system noise. While many existing methods usually consider one broken network at a time, CRD can integrate multiple successive broken networks for more reliable fault diagnosis.

A description will now be given regarding preliminaries and a problem definition to which the present invention is applied, in accordance with an embodiment of the present invention.

The aforementioned description will commence with a description of the invariant network model and broken invariants, in accordance with an embodiment of the present invention.

The invariant model is used to uncover significant pairwise relationships among massive set of time series. Let x(t) and y(t) be a pair of time series under consideration, such as two sensor readings on two system components, where t is the time index, then their relationship can be described by a linear regression function according to the AutoRegressive eXogenous (ARX) model:

$$y(t)=a_1y(t-1)+ \ldots +a_ny(t-n)+b_0x(t-k)+ \ldots +b_mx(t-k-m) \quad (1)$$

where [n, m] is the order of the model, which determines how many previous steps are affecting the current output. k is a time delay factor between x and y. Parameters $a_i$ and $b_j$ indicate how strongly a previous step is impacting the current output, which can be learned by the least-square fitting of Equation (1) to the training data. In real-world applications such as anomaly detection in physical systems, $0 \leq m, n, k \leq 2$ is a popular choice.

Let $\theta=\{a_1, \ldots, a_n, b_0, \ldots, b_m\}$ be the model parameters, after it is obtained, the prediction of y(t) can be found using Equation (1) by feeding $\theta$ and observations y(t-1), ..., y(t-n), x(t-k), ..., x(t-k-m). Let $\hat{y}(t, \theta)$ represent the prediction, once it is obtained, a fitness score $F(\theta)$ is used to evaluate how well the learned model $\theta$ fits the real observations as follows:

$$F(\theta) = 1 - \sqrt{\frac{\sum_{t=1}^{N} |y(t) - \hat{y}(t, \theta)|^2}{\sum_{t=1}^{N} |y(t) - \bar{y}|^2}} \quad (2)$$

where N and $\bar{y}$ are the length and mean of the time series y(t), respectively. A large fitness score indicates a better fitting of the model. Then, an invariant is declared on a pair of times series x and y if the fitness score is larger than a pre-defined threshold. A network including all the invariant links is called an invariant network.

After training the invariant model, each invariant will be tracked using a normalized residual R(t) as follows:

$$R(t)=|y(t)-\hat{y}(t,\theta)|/\varepsilon_{max} \quad (3)$$

where $\varepsilon_{max}=\max_{1 \leq t \leq N}|y(t)-\hat{y}(t, \theta)|$ is the maximal error. If the residual exceeds a prefixed threshold, then the invariant is declared as "broken", i.e., the corresponding dependency relationship vanishes. At time $t=T_b$, a network including all nodes in the invariant network and all broken edges is called a broken network at time $T_b$.

The further description of the aforementioned problem will now be given, in accordance with an embodiment of the present invention.

We represent the invariant network and broken network by their corresponding adjacency matrices $A \varepsilon \{0, 1\}^{n \times n}$ and $\varepsilon \{0, 1\}^{n \times n}$, where n is the number of nodes (i.e., system components) in the system. The two matrices can be obtained elsewhere herein. An entry $A_{xy}$ equals 1 indicates an invariant dependency exists between nodes x and y; 0 otherwise; and an entry $B_{xy}$ equals 1 indicates the invariant link between nodes x and y is broken; 0 otherwise. The proposed CRD algorithm also allows A and B to be continuous. In this case, $A_{xy}$ and $B_{xy}$ can be weighted by fitness score $F(\theta)$ (Equation (2)) and residual $R(t)$ (Equation (3)), respectively.

In an embodiment, the present invention is directed to detecting abnormal nodes in invariant network A that are most likely to be the causes of the broken edges in B. Since such anomalies may exist in multiple clusters, we call them multifaceted causal anomalies. Accurately detecting multifaceted causal anomalies will be extremely useful for debugging complex system problems that are jointly defined by different impaired functional modules (i.e., broken node clusters).

A description will now be given of the CRD algorithm, in accordance with an embodiment of the present invention.

The CRD algorithm is a two-phase framework. In Phase I, CRD ranks and identifies node clusters by their severities of impairments. In Phase II, CRD backtracks causal anomalies by modeling multiple local fault propagations in different broken clusters. It is worth mentioning that existing methods are unaware of the clustering structures of the invariant network and broken network.

A description will now be given regarding Phase I and broken cluster identification, in accordance with an embodiment of the present invention.

First, we propose a probabilistic clustering model to jointly cluster invariant network and broken network, and in the meantime, rank broken clusters. The intuition for the joint clustering is that, a set of nodes that work coordinately in normal status and break concurrently in abnormal status are more likely to be in the same cluster. Therefore, jointly clustering the two networks will be useful to enhance the accuracy of identifying broken clusters.

A description will now be given regarding the basic clustering method, in accordance with an embodiment of the present invention.

We adopt the doubly stochastic matrix decomposition as the basic method to cluster an invariant network due to its superior performance on sparse networks, which is introduced as follows:

Suppose there are k clusters in an invariant network A, let $U \in \mathbb{R}_+^{n \times k}$ be a cluster membership matrix with $U_{xi} = P(i|x)$ indicating the probability that node x belongs to cluster i. Then, a doubly stochastic approximation to A is defined by the following:

$$\hat{A}_{xy} = \sum_{i=1}^{k} \frac{U_{xi}U_{yi}}{\sum_{z=1}^{n} U_{zi}} \quad (4)$$

where i is the cluster index, x, y and z are node indexes. Note $\hat{A} \in \mathbb{R}_+^{n \times n}$ is symmetric and both of its columns and rows sum up to 1. Therefore, it is referred to as doubly stochastic.

The clustering problem is to infer U by minimizing the approximation error of the KL-Divergence $D_{KL}(A \| \hat{A})$. After removing some constants, this is equivalent to minimize the following:

$$-\Sigma_{(x,y) \in \varepsilon_A} A_{xy} \log \hat{A}_{xy} \quad (5)$$

where $\varepsilon_A$ represents the set of all edges in network A.

To provide control of the sparsity of U, a Dirichlet prior on U can be introduced, which gives the following objective function for individual network clustering:

$$\mathcal{J}_A(U) = -\sum_{(x,y) \in \varepsilon_A} A_{xy} \log \hat{A}_{xy} - (\alpha - 1)\sum_{xi} \log U_{xi} \quad (6)$$

$$\text{s.t. } U \geq 0, U 1_k = 1_n$$

where $\alpha(\alpha \geq 1)$ is a parameter in the Dirichlet distribution, large $\alpha$ usually results in more non-zero entries in U. $1_k$ is a column vector of length k with all 1's. The equality constraint preserves the probabilistic interpretation of $U_{xi}$.

A description will now be given regarding ranking broken clusters, in accordance with an embodiment of the present invention.

Next, we develop a method to rank clusters by their broken severities. The method of the present invention uses a generative process to model broken invariants in B. The intuition is that, if two nodes x and y reside in the same severely broken cluster, the invariant link (x, y) is more likely to break. Here, we need a metric to quantify how severe a cluster is broken. Thus for each cluster i in the invariant network, we define an unknown broken score as $s_i(0 \leq s_i \leq 1)$. A higher $s_i$ means a more severely broken cluster i.

To evaluate how likely an invariant link (x, y) will break, we need a probability for this event. According to the above intuition, this probability should satisfy two criteria: (1) within [0, 1]; and (2) it is large only if nodes x and y belong to the same cluster i and cluster i has a high broken score $s_i$. Therefore, we propose to use the following:

$$P_b(x,y) = \Sigma_{i=1}^{k} U_{xi} U_{yi} s_i \quad (7)$$

as the broken probability of an invariant (x, y). It is easy to verify $P_b(x, y)$ satisfies the above two criteria. Then, to model the sparse occurrences of broken edges, we follow the convention of modeling sparse networks and use Bernoulli distribution to simulate the generation of a broken invariant (x, y) by the following:

$$B_{xy} \sim \text{Bernoulli}(P_b(x,y)) \quad (8)$$

Let $\varepsilon_B$ be the set of all edges in B, then the probability to collectively generate a broken network is as follows:

$$P(B|U,s) = \Pi_{(x,y) \in \varepsilon_B} P_b(x,y) \Pi_{(x,y) \in \varepsilon_A \setminus \varepsilon_B} [1 - P_b(x,y)] \quad (9)$$

Let $W \in \{0, 1\}^{n \times n}$ be an indicator matrix, with $W_{xy} = 1$ if $(x, y) \in \varepsilon_A \setminus \varepsilon_B$, i.e., (x, y) is a non-broken invariant link. Then we can write the negative log-likelihood function as follows:

$$\mathcal{J}_B(U, s) = \quad (10)$$
$$-\sum_{xy} B_{xy} \log\left(\sum_i U_{xi} U_{yi} s_i\right) - \sum_{xy} W_{xy} \log\left(1 - \sum_i U_{xi} U_{yi} s_i\right)$$

which is our objective for learning to rank broken clusters. Here, the variable $s_i$ serves as the ranking score. Hereinafter, its use is described for enhancing anomaly detection.

A description will now be given regarding a unified objective function, in accordance with an embodiment of the present invention.

As discussed above, to leverage the complementary information in invariant and broken networks, we integrate $\mathcal{J}_A$ in Equation (6) and $\mathcal{J}_B$ in Equation (10) into a joint optimization problem as follows:

$$\min_{U,s} \mathcal{J}_{VR}(U,s) = \mathcal{J}_A + \beta \mathcal{J}_B$$

$$\text{s.t. } U 1_k = 1_n, U \geq 0, 0 \leq s_i \leq 1, \forall 1 \leq i \leq k \quad (11)$$

where β is a parameter to balance $\mathcal{J}_A$ and $\mathcal{J}_B$. Intuitively, the more reliable the broken network the larger the β.

A description will now be given regarding Phase II and causal anomaly ranking, in accordance with an embodiment of the present invention.

To infer causal anomalous nodes, we consider the very practical scenario of fault propagation, namely anomalous system status can always be traced back to a set of initial seed nodes, i.e., causal anomalies. These anomalies can propagate along the invariant network, most probably towards neighbors via paths represented by the invariant links in A. To model this process, we employ a label propagation technique. Suppose there is an unknown seed vector $e \in R_+^{n \times 1}$ with $e_x$ denoting the degree that node x is a causal anomaly. After propagation, each node x will obtain a status score $r_x$ to indicate to what extent it is impacted by the causal anomalies. Then the propagation from e to r can be modeled by the following optimization problem:

$$\min_{r \geq 0} c \sum_{x,y=1}^{n} A_{xy} \left( \frac{r_x}{\sqrt{D_{xx}}} - \frac{r_y}{\sqrt{D_{yy}}} \right)^2 + (1-c) \sum_{x=1}^{n} (r_x - e_x)^2 = \quad (12)$$

$$cr^T(I_n - \tilde{A})r + (1-c)\|r - e\|_F^2$$

where $I_n$ is an n×n identity matrix, $\tilde{A}=D^{-1/2} AD^{-1/2}$ is a symmetrically normalized matrix of A, and D is a diagonal matrix with $D_{xx} = \sum_{y=1}^{n} A_{xy}$.

The first term in Equation (12) encourages neighboring nodes to have similar status scores, and the second term penalizes large bias from the initial seeds. c is a parameter balancing the two terms. It can be verified that the closed-form solution to Equation (12) is as follows:

$$r = (1-c)(I_n - c\tilde{A})^{-1}e \quad (13)$$

which establishes an explicit relationship between r and e.

As discussed herein, in real-world applications, causal anomalies often propagate their impacts inside their associated clusters. Thus, for each cluster i, we define $e^{(i)} \in R_+^{n \times 1}$ as a cluster-specific seed vector. Moreover, instead of directly using $e_x^{(i)}$ as the causal anomaly score of node x, we use $U_{xi} e_x^{(i)}$, where $U_{xi}$ is obtained in Phase I, to emphasize that, node x is a causal anomaly of cluster i if it resides in cluster i (with a large $U_{xi}$ value) and is abnormal (with a large $e_x^{(i)}$ value).

Correspondingly, different clusters will have different status score vectors $r^{(i)} \in R_+^{n \times 1}$. Then the propagation relationship between $e^{(i)}$ and $r^{(i)}$ can be represented by the following:

$$r^{(i)} = (1-c)(I_n - c\tilde{A})^{-1}(U_{*i} \circ e^{(i)}) \quad (14)$$

where ∘ is entry-wise product, $U_{*i}$ is the $i^{th}$ column of U.

To exploit a broken edge pattern, we propose to use $\{r^{(i)}\}_{i=1}^{k}$ to reconstruct the broken network B. The intuition is as follows. When an invariant link (x, y) is broken, i.e., $B_{xy}$ is large, then at least one node of x and y should be perturbed by some causal anomalies from some clusters. That is, either $r_x^{(i)}$ or $r_y^{(i)}$ is large for some i. This suggests a reconstruction error as follows:

$$\Sigma_{(x,y) \in \varepsilon_A}(\Sigma_{i=1}^{k} r_x^{(i)} r_y^{(i)} - B_{xy})^2 \quad (15)$$

Let $E=[e^{(1)}, \ldots, e^{(k)}]$, $R=[r^{(1)}, \ldots, r^{(k)}]$, and $H=(1-c)(I_n - c\tilde{A})^{-1}$, from Equation (14), we have R=H(U∘E). Then, let $C \in \{0,1\}^{n \times n}$ be an indicator matrix with $C_{xy}=1$ if (x, y)$\in \varepsilon_A$, we can rewrite Equation (15) by a matrix form and obtain the following objective function:

$$\min_{E \geq 0} \mathcal{J}_H = \|C \circ [H(U \circ E)(U \circ E)^T H^T] - B\|_F^2 + \tau\|E\|_1 \quad (16)$$

Here, a $\ell_1$ norm on E is added to encourage sparsity of E because practically often a few nodes could be causal anomalies. τ is a controlling parameter, a larger τ typically results in more zeros in E.

A description will now be given regarding ranking with unified scores, in accordance with an embodiment of the present invention.

To integrate the results from Phase I and II, we propose a unified causal anomaly score $f_x$ for each node x. Ideally, this score should place more priority to a node x if it is a causal anomaly to some cluster i (with large $U_{xi} e_x^{(i)}$) and cluster i is broken severely (with large $s_i$). This suggests a simple form $f_x = U_{xi} e_x^{(i)} s_i$. Equivalently, the score vector f is as follows:

$$f = (U \circ E)s \quad (17)$$

To summarize, in our CRD algorithm, we first optimize a $\mathcal{J}_{CR}$ in Equation (11) to solve U and s in Phase I, then plug U into $\mathcal{J}_H$ in Equation (16) and solve E. Finally, all nodes are sorted using f in Equation (17), with most suspicious nodes on the top. Algorithm 1 summarizes the proposed CRD algorithm, which will be explained in detail hereinafter.

A description will now be given regarding the learning algorithm for phase I, in accordance with an embodiment of the present invention.

The objective function in Equation (11) is not jointly convex in U and s, hence we take an alternating minimization framework that alternately solves U and s until a stationary point is achieved.

First, to solve U, we use an Auxiliary Function approach to derive a multiplicative updating rule. Before presenting the solution, we need to introduce several notations. Let $\mathcal{J}_{CR}(U)$ be the objective function in Equation (11) with respect to U, then the Lagrangian function of $\mathcal{J}_{CR}$ with respect to U is as follows:

$$\mathcal{L}_U(U,\lambda) = \mathcal{J}_{CR}(U) + \Sigma_{x=1}^{n} \lambda_x (\Sigma_{i=1}^{k} U_{xi} - 1) \quad (18)$$

where $\lambda = (\lambda_1, \ldots, \lambda_n)^T$ are the Lagrangian multipliers.

Let the gradient of $\mathcal{J}_{CR}$ with respect to U be $\nabla_U = (\nabla_U)^+ - (\nabla_U)^-$, where $(\nabla_U)^+$ and $(\nabla_U)^-$ represent the positive and non-positive parts of $\nabla_U$, respectively. Then the following theorem summarizes the solution.

Theorem 1. Let $\lambda_x = (b_x - 1)/a_x$ where $$a_x = \sum_{i=1}^{k} \frac{U_{xi}}{(\nabla_U)_{xi}^+}, \quad b_x = \sum_{i=1}^{k} U_{xi} \frac{(\nabla_U)_{xi}^-}{(\nabla_U)_{xi}^+} \quad (19)$$

It holds that $\mathcal{L}_U(U^{(new)}, \lambda) \leq \mathcal{L}_U(U, \lambda)$, by updating U according to Equation (20) as follows:

$$(U_{xi})^{(new)} \leftarrow U_{xi} \frac{a_x (\nabla_U)_{xi}^- + 1}{a_x (\nabla_U)_{xi}^+ + b_x} \quad (20)$$

From Theorem I, we can iteratively apply Equation (20) to decrease the objective value of Equation (11). In this process, U will be automatically adjusted to satisfy the equality constraint in Equation (11). Note Equation (20) can be directly applied without explicitly specifying the value of $\lambda$ in the algorithm, since the definition of $\lambda$ has already been embedded into Equation (20).

To solve s, we use a similar approach as before involving Karush-Kuhn-Tucker (KKT) conditions. We denote $\mathcal{J}_{CR}(s)$ as the objective function in Equation (11) with respect to s. Similarly, let the gradient of $\mathcal{J}_{CR}(s)$ with respect to s as $\nabla_s = (\nabla_s)^+ - (\nabla_s)^-$. Then the following theorem presents the solution to s.

Theorem 2. Fixing other variables, updating s according to Equation (21) monotonically decreases the objective value in Equation (11) until convergence.

$$s_i \leftarrow \min(s_i[(\nabla_s)_i^-/(\nabla_s)_i^+], 1) \quad (21)$$

Therefore, by alternating between Equation (20) and Equation (21), the optimization problem in Phase I is solved.

A description will now be given regarding the learning algorithm for phase II, in accordance with an embodiment of the present invention.

In Phase II, before solving E for Equation (16), matrix H should be pre-computed, which involves a time consuming $O(n^3)$ matrix inversion (see Equation (16)). To avoid that, we can employ the following lemma.

Lemma 1. Set $\hat{H}^{(0)} = I_n$. As $\rightarrow \infty$, $\hat{H}^{(t)}$ converges to H by iteratively updating $\hat{H}^{(t)}$ by Equation (22) as follows:

$$\hat{H}^{(t+1)} \leftarrow c\tilde{A}\hat{H}^{(t)} + (1-c)I_n \quad (22)$$

The complexity of Equation (22) is O(mn), where m and n are the number of edges and nodes in A. When A is sparse, it reduces to $O(n^2)$. Thus $\hat{H}$ can be computed efficiently.

Now, with the pre-computed H, we use the Auxiliary Function approach to derive the solution to E, which is summarized by the following theorem.

Theorem 3. Updating E by Equation (23) monotonically decreases the objective value in Equation (16) until convergence as follows:

$$E_{xi} \leftarrow E_{xi} \left( \frac{4(\Phi \circ U)_{xi}}{4(\Theta \circ U)_{xi} + \tau} \right)^{\frac{1}{4}} \text{ where} \quad (23)$$

$$\Theta = \hat{H}^T \{ C \circ [\hat{H}(U \circ E)(U \circ E)^T \hat{H}^T] \} \hat{H}(U \circ E) \text{ and}$$

$$\Phi = \hat{H}^T (B \circ C) \hat{H}(U \circ E).$$

Based on Theorem 1, 2 and 3, we develop the iterative multiplicative algorithm CRD, as summarized in Algorithm 1.

A description will now be given of a theoretical analysis, in accordance with an embodiment of the present invention.

Convergence Analysis. Next, we use the Auxiliary Function approach to prove the convergence of Equation (23) in Theorem 3. Proofs of Theorem 1 and 2 are based on a similar idea.

Definition 1. A function $Z(h, \tilde{h})$ is an auxiliary function for a given J(h) in the conditions $Z(h, \tilde{h}) \geq J(h)$ and $Z(h, h) = J(h)$ are satisfied.

The following theorem presents the auxiliary function for $\mathcal{J}_H$ in Equation (16).

Theorem 4. Let $\mathcal{J}_H(E)$ denote the sum of all terms in Equation (16) that contains E, then the following function:

$$\mathcal{Z}_E(E, \tilde{E}) = -2 \sum_{xi} (\Phi \circ U)_{xi} \tilde{E}_{xi} \left( 1 + \log \frac{E_{xi} E_{yi}}{\tilde{E}_{xi} \tilde{E}_{yi}} \right) + \quad (24)$$

-continued $$\sum_{xi} (\tilde{\Theta} \circ U)_{xi} \frac{E_{xi}^4}{\tilde{E}_{xi}^3} + \frac{\tau}{4} \sum_{xi} \frac{E_{xi}^4 + 3\tilde{E}_{xi}^4}{\tilde{E}_{xi}^3}$$

is an auxiliary function for $\mathcal{J}_H(E)$. Here $\tilde{\Theta} = \{C \circ [H(U \circ \tilde{E})(U \circ \tilde{E})^T H^T]\} H(U \circ \tilde{E})$ and $\tilde{\Phi} = H^T(B \circ C)H(U \circ \tilde{E})$. Moreover, this function is a convex function in E and its global minimum is as follows:

$$E_{xi} = \tilde{E}_{xi} \left( \frac{4(\tilde{\Phi} \circ U)_{xi}}{4(\tilde{\Theta} \circ U)_{xi} + \tau} \right)^{\frac{1}{4}} \quad (25)$$

$$\mathcal{J}_H(E^{(\varkappa)}) = \mathcal{Z}_E(E^{(\varkappa)}, E^{(\varkappa)}) \geq \mathcal{Z}_E(E^{(\varkappa+1)}, E^{(\varkappa)}) \geq \mathcal{J}_H(E^{(\varkappa+1)})$$

Briefly, Theorem 4 can be proved by validating $\mathcal{Z}_E(e, \tilde{E}) \geq \mathcal{J}_H(E)$, $\mathcal{Z}_E(E, E) = \mathcal{J}_H(E)$ and the Hessian matrix $\nabla_E^2 \mathcal{Z}_E(E, \tilde{e}) \geq 0$.

From Definition 1 and Theorem 4 (Note Equation (25) is consistent with Equation (23)), at any iteration $\varkappa \geq 1$, we have the following:

$$\mathcal{J}_H(E^{(\varkappa)}) = \mathcal{Z}_E(E^{(\varkappa)}, E^{(\varkappa)}) \geq \mathcal{Z}_E(E^{(\varkappa+1)}, E^{(\varkappa)}) \geq$$
$$\mathcal{J}_H(E^{(\varkappa+1)}).$$

Thus $\mathcal{J}_H$ monotonically decreases. Since Equation (16) is bounded below by zero, the updating of E will converge, and Theorem 3 is proved. Using a similar approach, we have proved Theorem 1 and 2. Thus, the iterative algorithms of both Phase I and II will converge, which proves the convergence of Algorithm 1.

Complexity Analysis. Let n and m be the number of nodes and edges in A, respectively. The time complexity for updating U and s is $O(T_1(mk+nk^2))$, where $T_1$ is the number of iterations in Phase I. Let $T_2$ and $T_3$ be the number of iterations for updating $\hat{H}$ and E, respectively, then the time for updating $\hat{H}$ is $O(T_2 mn)$ using sparse matrix multiplication, the time for updating E is $O(T_3 n^2 k)$. Therefore, let $T_m = \max(T_1, T_2, T_3)$, the overall time complexity of CRD is $O(T_m n^2)$, considering k is a small constant and A (and $\tilde{A}$) is often sparse s.t. m is linear with respect to n. In practice, we find that Algorithm 1 often converges fast, with a small $T_m$.

A description will now be given regarding leveraging multiple temporal broken networks, in accordance with an embodiment of the present invention.

As discussed above, causal anomalies are usually stable in a short time period when fault propagates in the system. Therefore, jointly analyzing multiple temporal broken networks has the potential to resolve the ambiguities in each snapshot that are brought by system noises. Next, we introduce how to extend CRD to a temporal setting.

First, in Phase I, we can replace B and W in $\mathcal{J}_B$ in Equation (10) by $B^{(t)}$ and $W^{(t)}$ respectively to indicate the time point t. Let $\mathcal{J}_B^{(t)}$ represent the resulting function in Equation (10) using $B^{(t)}$ and $W^{(t)}$, then $\mathcal{J}_{CR}$ in Equation (11) becomes the following:

$$\mathcal{J}_{CR}^{(t)}(U,s,\omega) = \mathcal{J}_A + \beta \Sigma_{t=1}^T \omega_t \mathcal{J}_B^{(t)} + \gamma \|\omega\|_F^2 \quad (26)$$

where a weighting vector $\omega = [\omega_1, \ldots, \omega_T]$ is introduced to control the relative contributions of the successive broken networks in the time window T. By optimizing Equation (26), inconsistent or non-informative snapshot $B^{(t)}$ will learn a small $\omega_t$ to reduce its negative impact. The $\ell_2$ norm on $\omega$ is used to avoid overfitting. $\gamma$ is a regularization parameter.

Typically, a large γ results in more non-zero entries in ω. Moreover, to learn interpretable weights, we also enforce constraints ω≥0 and $\Sigma_{t=1}^T \omega_t = 1$.

Similarly, in Phase II, the objective function in Equation (16) can be generalized to the following:

$$\mathcal{J}_H^{(t)}(E,\hat{\omega}) = Tr = 1\hat{\omega}_t \|C \circ [H(U \circ E)(U \circ E)^T H^T] - B^{(t)}\|_F^2 + \tau\|E\|_1 + \gamma\|\hat{\omega}\|_F^2 \quad (27)$$

where $\hat{\omega}$ is another weighting vector. We also enforce $\hat{\omega} \geq 0$ and $\Sigma_{t=1}^T \hat{\omega}_t = 1$.

The optimization formula of U, s and E for Equation (26) and Equation (27) are the same as before in Equation (20), Equation (21) and Equation (23), except that in Equation (20) and Equation (21), B is replaced by $\Sigma_{t=1}^T \omega_t B^{(t)}$, W is replaced by $\Sigma_{t=1}^T \omega_t W^{(t)}$ and in Equation (23), B is replaced by $\Sigma_{t=1}^T \hat{\omega}_t B^{(t)}$.

In Equation (26) (or Equation (27)), the sub-problem with respect to ω (or $\hat{\omega}$) is a convex problem and can be solved using existing solvers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims.

Whats is claimed is:

1. A system for identifying multiple causal anomalies in a power plant system having multiple system components, comprising:
   a processor, configured to
      construct an invariant network model having (i) a plurality of nodes, each representing a respective one of the multiple system components and (ii) a plurality of invariant links, each representing a stable component interaction;
      construct a broken network model having (i) all of the plurality of nodes in the invariant network model and (ii) a set of broken links existing at a given time, each representing an unstable component interaction;
      rank causal anomalies in node clusters in the invariant network model to obtain anomaly score results therefor;
      generate, using a joint optimization clustering process applied to the models, (i) a clustering structure for the models and (ii) a set of broken cluster scores, each representing a respective one of multiple degrees of brokenness for node clusters in the broken network model; and
      perform weighted fusion ranking on the anomaly score results and the set of broken cluster scores, based on the clustering structure and implicated degrees of severity of any abnormal ones of the multiple system components, to identify the multiple causal anomalies in the power plant system.

2. The system of claim 1, wherein the processor is further configured to perform an offline invariant graph training process on pairs of time-series data output from the multiple system components, and wherein the invariant network model is formed based on an output of the invariant graph training process.

3. The system of claim 1, wherein the processor is further configured to perform an online broken invariant testing process on pairs of time-series data output from the multiple system components, and wherein the broken network model is formed based on an output of the invariant graph training process.

4. The system of claim 1, wherein the joint optimization clustering process comprises a stochastic matrix decomposition process applied to the invariant network model in order to cluster the plurality of nodes in the invariant network model.

5. The system of claim 1, wherein the processor is further configured to propagate labels in the invariant network model at a node-cluster-level commencing from a set of seed anomalies in varying ones of the node clusters in the invariant network model, based at least on the clustering structure of the invariant network model, wherein the labels representative respective degrees of impact on the node clusters in the invariant network model due to the seed anomalies.

6. The system of claim 5, wherein each of the labels provides a status score indicative of a corresponding one of the respective degrees of impact on the node clusters in the invariant network model due to the seed anomalies.

7. The system of claim 5, wherein the processor is further configured to model a reconstruction error of propagated anomalies at a node-cluster-level in the broken network model based on the labels.

8. The system of claim 1, wherein the processor is further configured to integrate (i) the clustering structure, (ii) the broken cluster scores, and (iii) the anomaly score results for the node clusters in the invariant network model into a final causal anomaly vector that represents the multiple causal anomalies as multiple fault propagations occurring in the node clusters in the invariant network model.

9. The system of claim 1, wherein the processor is further configured to perform a set of curative actions to fix the multiple causal anomalies and return the power plant system to a stable state.

10. The system of claim 1, wherein the processor is further configured to segregate any of the multiple system components associated with the multiple causal anomalies from other ones of the multiple system components in order to mitigate fault propagation in the power plant system.

11. A computer-implemented method for identifying multiple causal anomalies in a power plant system having multiple system components, comprising:
 constructing, by a processor, an invariant network model having (i) a plurality of nodes, each representing a respective one of the multiple system components and (ii) a plurality of invariant links, each representing a stable component interaction;
 constructing, by the processor, a broken network model having (i) all of the plurality of nodes in the invariant network model and (ii) a set of broken links existing at a given time, each representing an unstable component interaction;
 ranking, by the processor, causal anomalies in node clusters in the invariant network model to obtain anomaly score results therefor;
 generating, by the processor using a joint optimization clustering process applied to the models, (i) a clustering structure for the models and (ii) a set of broken cluster scores, each representing a respective one of multiple degrees of brokenness for node clusters in the broken network model; and
 performing, by the processor, weighted fusion ranking on the anomaly score results and the set of broken cluster scores, based on the clustering structure and implicated degrees of severity of any abnormal ones of the multiple system components, to identify the multiple causal anomalies in the power plant system.

12. The computer-implemented method of claim 11, further comprising performing an offline invariant graph training process on pairs of time-series data output from the multiple system components, and wherein the invariant network model is formed based on an output of the invariant graph training process.

13. The computer-implemented method of claim 11, further comprising performing an online broken invariant testing process on pairs of time-series data output from the multiple system components, and wherein the broken network model is formed based on an output of the invariant graph training process.

14. The computer-implemented method of claim 11, wherein the joint optimization clustering process comprises a stochastic matrix decomposition process applied to the invariant network model in order to cluster the plurality of nodes in the invariant network model.

15. The computer-implemented method of claim 11, further comprising propagating labels in the invariant network model at a node-cluster-level commencing from a set of seed anomalies in varying ones of the node clusters in the invariant network model, based at least on the clustering structure of the invariant network model, wherein the labels representative respective degrees of impact on the node clusters in the invariant network model due to the seed anomalies.

16. The computer-implemented method of claim 15, wherein each of the labels provides a status score indicative of a corresponding one of the respective degrees of impact on the node clusters in the invariant network model due to the seed anomalies.

17. The computer-implemented method of claim 15, further comprising modeling a reconstruction error of propagated anomalies at a node-cluster-level in the broken network model based on the labels.

18. The computer-implemented method of claim 11, further comprising integrating (i) the clustering structure, (ii) the broken cluster scores, and (iii) the anomaly score results for the node clusters in the invariant network model into a final causal anomaly vector that represents the multiple causal anomalies as multiple fault propagations occurring in the node clusters in the invariant network model.

19. The computer-implemented method of claim 11, further comprising performing a set of curative actions to fix the multiple causal anomalies and return the power plant system to a stable state.

20. A computer program product for identifying multiple causal anomalies in a power plant system having multiple system components, the computer program product comprising a non-transitory computer readable storage medium having program instructions embodied therewith, the program instructions executable by a computer to cause the computer to perform a method comprising:
 constructing, by a processor, an invariant network model having (i) a plurality of nodes, each representing a respective one of the multiple system components and (ii) a plurality of invariant links, each representing a stable component interaction;
 constructing, by the processor, a broken network model having (i) all of the plurality of nodes in the invariant network model and (ii) a set of broken links existing at a given time, each representing an unstable component interaction;
 ranking, by the processor, causal anomalies in node clusters in the invariant network model to obtain anomaly score results therefor;
 generating, by the processor using a joint optimization clustering process applied to the models, (i) a clustering structure for the models and (ii) a set of broken cluster scores, each representing a respective one of multiple degrees of brokenness for node clusters in the broken network model; and
 performing, by the processor, weighted fusion ranking on the anomaly score results and the set of broken cluster scores, based on the clustering structure and implicated degrees of severity of any abnormal ones of the multiple system components, to identify the multiple causal anomalies in the power plant system.

* * * * *